(12) United States Patent
Yanagida et al.

(10) Patent No.: US 7,315,236 B2
(45) Date of Patent: Jan. 1, 2008

(54) MONITORING DEVICE FOR MONITORING ELECTRONIC CONTROL UNITS ON A VEHICLE

(75) Inventors: Yo Yanagida, Shizuoka (JP); Naoyuki Shiraishi, Shizuoka (JP); Atsushi Kawamura, Shizuoka (JP); Terumitsu Sugimoto, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 212 days.

(21) Appl. No.: 11/183,758

(22) Filed: Jul. 19, 2005

(65) Prior Publication Data

US 2006/0017584 A1    Jan. 26, 2006

(30) Foreign Application Priority Data

Jul. 21, 2004    (JP)    ............................. 2004-212794

(51) Int. Cl.
*B60Q 1/00* (2006.01)
(52) U.S. Cl. ...................... 340/425.5; 340/428; 701/29
(58) Field of Classification Search ............. 340/425.5, 340/511, 428, 568.2, 568.3, 568.4, 310.18, 340/310.16; 701/29, 30, 31, 34, 36
See application file for complete search history.

(56) References Cited

U.S. PATENT DOCUMENTS

| | | | | |
|---|---|---|---|---|
| 4,079,357 | A | * | 3/1978 | Drebinger et al. ............. 701/29 |
| 4,463,340 | A | * | 7/1984 | Adkins et al. ............... 340/428 |
| 5,677,663 | A | * | 10/1997 | Sansome ..................... 340/428 |
| 5,767,771 | A | * | 6/1998 | Lamont .................... 340/568.3 |
| 6,028,507 | A | * | 2/2000 | Banks et al. ................ 340/428 |
| 6,630,749 | B1 | * | 10/2003 | Takagi et al. ............... 340/428 |
| 7,196,432 | B2 | * | 3/2007 | Emmerling et al. ........ 340/428 |

FOREIGN PATENT DOCUMENTS

JP    08-30873    2/1996

* cited by examiner

*Primary Examiner*—John Tweel, Jr.
(74) *Attorney, Agent, or Firm*—Finnegan, Henderson, Farabow, Garrett & Dunner, L.L.P.

(57) ABSTRACT

An ECU monitoring device includes a monitoring ECU connected to a power line for supplying power from a main battery to an immobilizer ECU. The monitoring ECU includes a high-frequency signal generating circuit for superimposing a high-frequency signal on the power line, a high-frequency signal detecting circuit for detecting the high-frequency signal superimposed on the power line and a CPU for judging a connection between the power line and the immobilizer ECU or between the power line and a false instrument. With the constitution, the ECU monitoring device can detect a situation that the immobilizer ECU is detached from a vehicle with high accuracy, preventing the vehicle from being stolen by theft.

8 Claims, 5 Drawing Sheets

FIG. 6
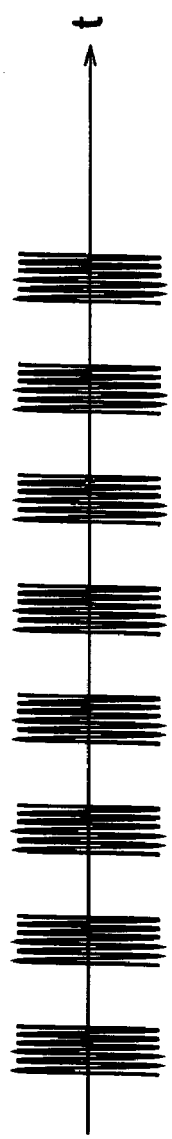
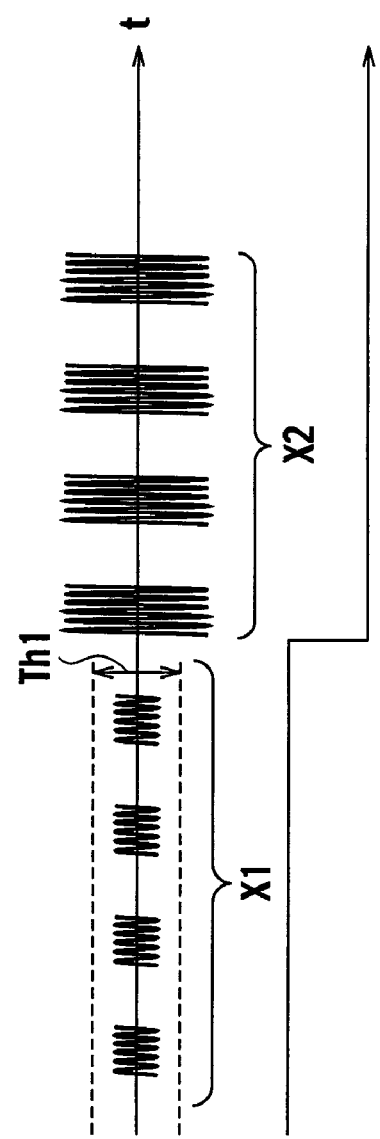
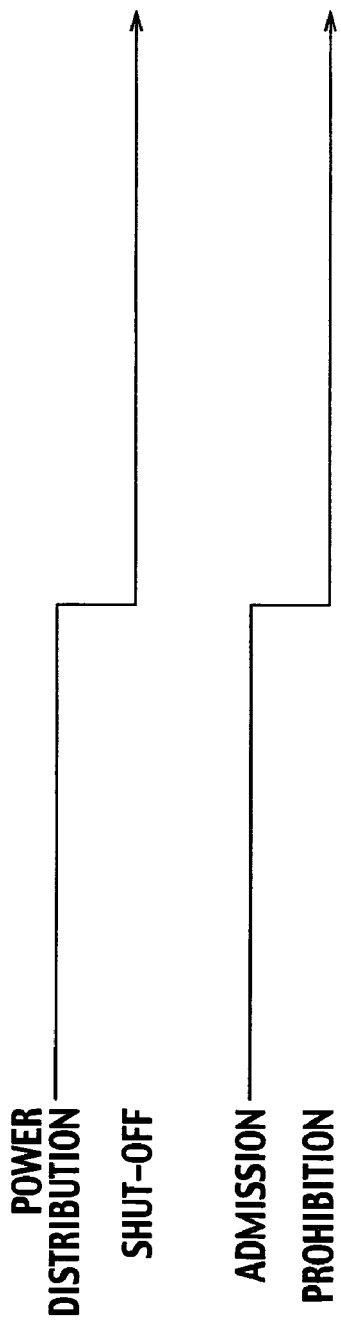

MONITORING DEVICE FOR MONITORING ELECTRONIC CONTROL UNITS ON A VEHICLE

BACKGROUND OF THE INVENTION

1. Field of the Invention

The present invention relates to a monitoring device for monitoring a connection between respective electronic control units (ECU) on a vehicle and power lines for supplying power to the ECU (ECU monitoring device hereinafter).

2. Description of the Related Art

Recently, there is a growing trend of vehicles equipped with antitheft systems (immobilizer systems) as measures for recent rash of stealing vehicles.

In general, an immobilizer system includes an ignition key having a transponder built-in, an immobilizer ECU, an engine ECU and so on. In operation, the immobilizer system is constructed so as to judge whether or not a vehicle is being used falsely by transmitting/receiving a code signal among the above constituents. Such a constitution is disclosed in Japanese Patent Publication Laid-open No. 8-30873.

However, if both or either one of the immobilizer ECU and the engine ECU is replaced by another instrument, then the immobilizer system breaks down. That is, it means that the immobilizer system cannot detect a vehicle being improperly used, so that it becomes impossible to protect the vehicle against theft.

In such a situation, it has been desired to provide a system of detecting a point of time when either the immobilizer ECU or the engine ECU is detached from the vehicle falsely and further informing a passenger of the vehicle or its circumference of such a false detachment. As this type of system, various monitoring systems shown in FIGS. 1 to 3 are known conventionally.

In the monitoring system of FIG. 1, a junction box (J/B) ECU 101 is connected to an immobilizer ECU 102 through an exclusive line L101. In operation, by measuring a voltage level of the exclusive line L101, it is judged whether or not the immobilizer ECU 102 is connected to the junction box (J/B) ECU 101. In detail, if the voltage of the line L101 is at a low level, it is judged that the exclusive line 101 is in the normal connection. While, if the voltage of the line L101 is at a high level, it is judged that the immobilizer ECU 102 is disconnected from the junction box (J/B) ECU 101 falsely.

In the above monitoring system of FIG. 1, however, the system is apt to be large-sized due to the need of providing the exclusive line L101 for monitoring the connection, causing the installation cost to be elevated. Additionally, since the same system is formed so as to detect a direct-current (DC) voltage, it is untreatable to a thieving procedure of first connecting the line L101 to a ground and subsequently detaching the immobilizer ECU 102 from the system. Thus, since the voltage of the exclusive line does not exhibit a high level, it is possible to detect that the immobilizer ECU 102 has been detached from the system.

In the monitoring system of FIG. 2, the junction box (J/B) ECU 101 is connected to the immobilizer ECU 102 through a power line L102. In operation, by measuring a dark current flowing the power line L102, if a value of the dark current is a few ($\mu A$), it is judged that the immobilizer ECU 102 is in the normal connection. While, if a value of the dark current is 0 ($\mu A$), it is judged that the immobilizer ECU 102 is disconnected from the junction box (J/B) ECU 101 falsely.

In the above monitoring system of FIG. 2, however, since a current to be detected is remarkably small, there is the possibility of misjudgment, raising a problem of the impossibility of detection with high accuracy.

In the monitoring system of FIG. 3, the junction box (J/B) ECU 101 is connected to the immobilizer ECU 102 through a CAN communication line L103. In operation, if the communication line L103 is connected between the junction box (J/B) ECU 101 and the immobilizer ECU 102 normally, then it is judged that the CAN communication is being performed normally. While, if the communication line L103 is cut off, it is judged that the immobilizer ECU 102 is detached from the system due to disruption in communication.

However, since the above system adopts the standard protocol communication, there is the possibility that if the system is operated with the use of a commercial instrument falsely, it becomes impossible to detect that the immobilizer ECU 102 has been detached.

As mentioned above, the conventional monitoring systems for ECU mounted on a vehicle have various problems. Commonly, there exists a drawback that it is impossible to detect that the immobilizer ECU 102 has been detached from the system, with high accuracy.

SUMMARY OF THE INVENTION

Under the circumstances, it is therefore an object of the present invention to provide an ECU monitoring device for monitoring ECU mounted on a vehicle, which is capable of detecting a situation that an immobilizer ECU is detached from a vehicle, with high accuracy so as to allow an owner's vehicle to be protected against theft.

The object of the present invention described above can be accomplished by a ECU monitoring device for monitoring a connection between electronic control units mounted on a vehicle, comprising: a main battery; a power line connecting the main battery with an electronic control unit to be monitored, thereby supplying the electronic control unit with a power of the main battery; and a monitoring unit connected to the power line, wherein the monitoring unit includes: a monitoring-signal generating unit for superimposing a monitoring signal on the power line connecting the main battery with the electronic control unit to be monitored; a monitoring-signal detecting unit for detecting the monitoring signal superimposed on the power line; and a judging unit for judging the presence of at least one connection between the power line and the electronic control unit to be monitored or connection between the power line and a false instrument, based on a level of the monitoring signal detected by the monitoring-signal detecting unit.

According to the first aspect of the invention, the monitoring-signal generating unit superimposes the monitoring signal on the power line, while the monitoring-signal detecting unit detects the monitoring signal superimposed on the power line. Based on the level of the monitoring signal detected by the monitoring-signal detecting unit, the judging unit judges the presence of at least either one connection between the power line and the electronic control unit to be monitored, such as immobilizer ECU, or another connection between the power line and a false instrument. Thus, it is possible to monitor such a connection with high accuracy.

As the second aspect of the invention, in the ECU monitoring device, the judging unit compares the level of the monitoring signal with a first threshold value pre-determined; the judging unit judges that the electronic control unit to be monitored is in a normal condition when the level of the monitoring signal is smaller than the first threshold value; and the judging unit judges that the electronic control unit to be monitored is disconnected from the power line when the level of the monitoring signal is equal to or larger than the first threshold value.

In the second aspect of the invention, comparing a level of the detected signal with the first threshold value, it is judged that the electronic control unit to be monitored is in a normal condition when the level of the monitoring signal is smaller than the first threshold value and that the electronic control unit to be monitored has been disconnected from the power line when the level of the monitoring signal is equal to or larger than the first threshold value. Therefore, the judgment with high accuracy can be accomplished and further, when a theft occurs, it is possible to inform the circumference about a vehicle of the occurrence.

As the third aspect of the invention, the judging unit compares the level of the monitoring signal with a second threshold value smaller than the first threshold value, and the judging unit judges that the electronic control unit to be monitored has been connected to the false instrument when the level of the monitoring signal is smaller than the second threshold value.

In the third aspect of the invention, comparing a level of the detected signal with the second threshold value, it is judged that no false instrument is connected to the power line when the level of the monitoring signal is equal to or more than the second threshold value and that a false instrument is connected to the power line when the level of the monitoring signal is smaller than the second threshold value. Therefore, the judgment with high accuracy can be accomplished and further, when a theft occurs, it is possible to inform the circumference about a vehicle of the occurrence.

As the fourth aspect of the invention, the monitoring signal comprises high-frequency signals outputted intermittently.

Then, with the use of the intermittent high-frequency signals, the detecting accuracy can be improved with a reduction in the power consumption.

As the fifth aspect of the invention, the ECU monitoring device further comprises a backup battery for supplying the monitoring unit with a driving power.

In this case, owing to the provision of the backup battery, even if the main battery is detached from the device falsely, it is possible to drive the monitoring unit, so that false manipulations, such as detachment of ECU and attachment of false instruments, can be detected certainly.

As the sixth aspect of the invention, the ECU monitoring device further comprises an alarm unit that generates an alarm signal when it is detected that the electronic control unit to be monitored is disconnected from the power line.

Then, owing to the provision of the alarm unit, it is possible to inform those around the vehicle of an execution of false manipulations certainly.

As the seventh aspect of the invention, the judging unit further stops a drive of an engine electronic control unit for controlling a drive of an engine when the judging unit judges that the electronic control unit to be monitored is disconnected from the power line or that the electronic control unit to be monitored is connected to the false instrument.

Since the drive of the engine electronic control unit is stopped when the false manipulations are detected, a theft cannot drive a vehicle, improving the antitheft capability of the vehicle.

As the eighth aspect of the invention, the electronic control unit to be monitored comprises an immobilizer electronic control unit for protecting the vehicle against theft.

In this case, it is possible to prevent a standstill in the operation of the immobilizer electronic control unit, preventing the vehicle from being stolen.

These and other objects and features of the present invention will become more fully apparent from the following description and appended claims taken in conjunction with the accompany drawings.

BRIEF DESCRIPTION OF THE DRAWINGS

FIG. 6 is a timing chart showing the change of a high-frequency signal and the changes of other signals when an immobilizer ECU is detached from the device.

DESCRIPTION OF THE PREFERRED EMBODIMENT

An embodiment of the present invention will be described with reference to the accompanying drawings.

Figure 1:
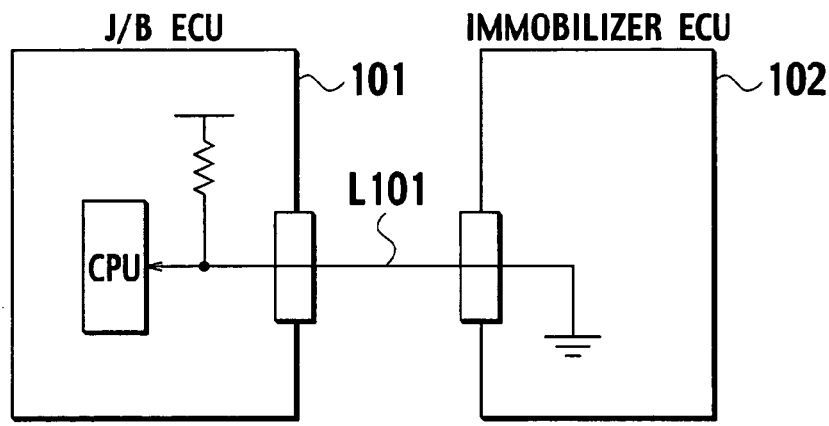
FIG. 1 is a block diagram showing the constitution of an ECU monitoring device as a first example in the conventional art.
Figure 2:
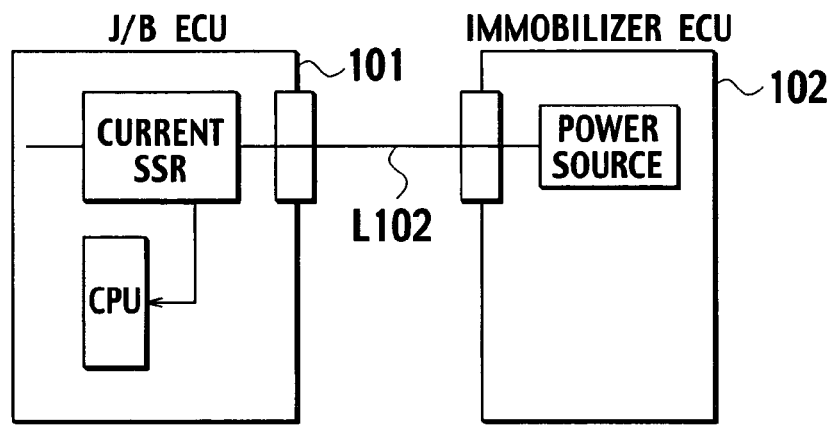
FIG. 2 is a block diagram showing the constitution of an ECU monitoring device as a second example in the conventional art.
Figure 3:
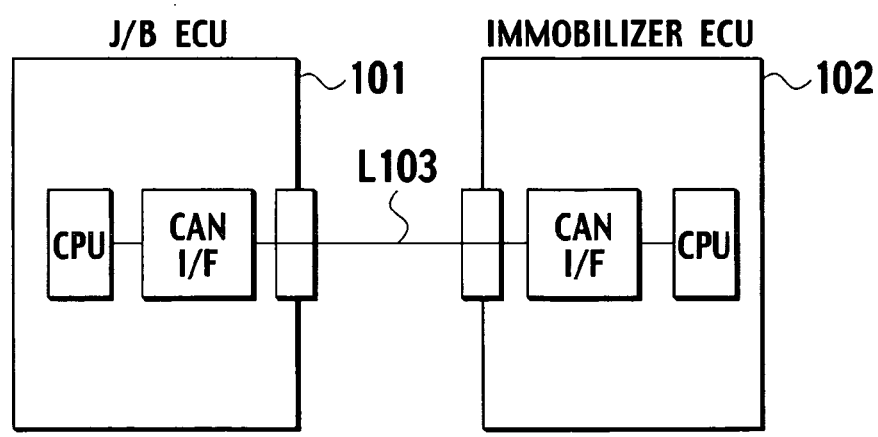
FIG. 3 is a block diagram showing the constitution of an ECU monitoring device as a third example in the conventional art.
Figure 4:
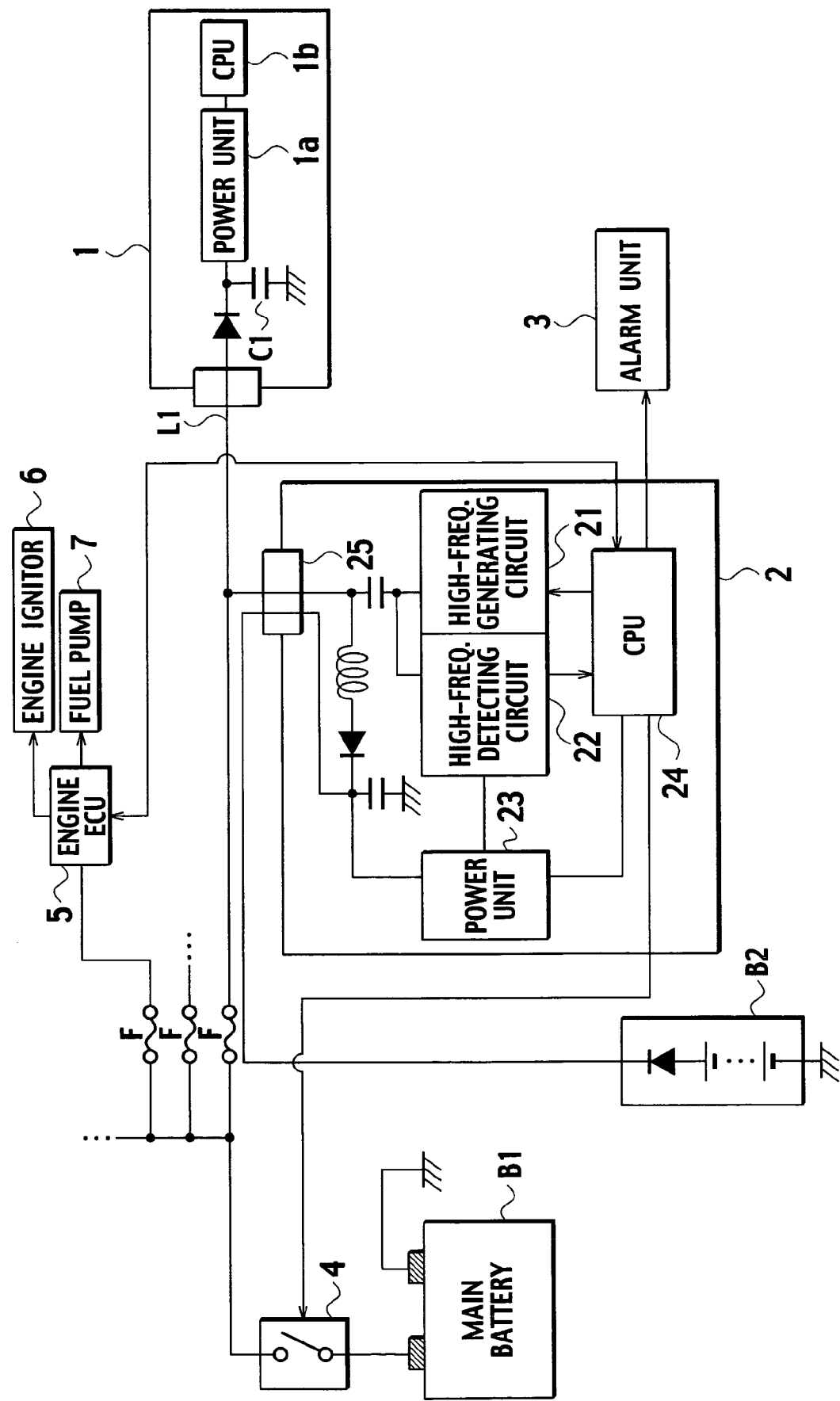
FIG. 4 is a block diagram showing the constitution of an ECU monitoring device in accordance with an embodiment of the present invention.

FIG. 4 is a block diagram showing the constitution of an ECU monitoring device of an embodiment of the present invention. As shown in FIG. 4, the ECU monitoring device includes a monitoring electronic control unit (ECU) 2, a backup power source B2 and an alarm unit 3. The monitoring ECU 2 which may be formed by a junction box (J/B) ECU is connected to a power line L1 connecting a main battery B1 mounted on a vehicle (not shown) with an immobilizer ECU 1 to be monitored. The backup power source B2 is provided to supply the monitoring ECU 2 with backup power when the power supply from the main battery B1 is stopped. The alarm unit 3 outputs an alarm signal when it is detected that the immobilizer ECU 1 is disconnected from the power line L1.

The main battery B1 is also connected to the power line L1 through a power-off device 4, while the power line L1 is connected to the immobilizer ECU 1. Thus, the immobilizer ECU 1 is energized by electrical power supplied from the main battery B1. A fuse F is interposed in the power line L1 in order to protect a circuit of the immobilizer ECU 1 at an occurrence of overcurrent.

The main battery B1 is also connected to other electronic control units (ECUs) besides the immobilizer ECU 1, for example, an engine ECU 5 for controlling the drive of an engine (not shown) generally. The engine ECU 5 is connected to an engine ignition unit (ignitor) 6 and a fuel pump 7 to control their operations.

The immobilizer ECU 1 has a power unit 1*a* for converting a voltage supplied from the main battery B1 to a predetermined level of voltage and a central processing unit (CPU)

1b for controlling the immobilizer ECU 1 as a whole. In the immobilizer ECU 1, a power supply terminal connected to the power line L1 is provided with a bypass condenser C1.

The monitoring ECU 2 includes a high-frequency signal generating circuit 21, a high-frequency signal detecting circuit 22, a power unit 23, a CPU 24 and a connector 25. The high-frequency signal generating circuit 21 superimposes a high-frequency signal (i.e. monitoring signal of e.g. 2.5 MHz) on the power line L1, constituting a monitoring-signal generating unit of the invention. On the other hand, the high-frequency signal detecting circuit 22 detects the high-frequency signal superimposed on the power line L1, constituting a monitoring-signal detecting unit of the invention. The power unit 23 converts a voltage supplied from the main battery B1 or the backup power source B2 into a desired voltage and further supplies respective components of the monitoring ECU 2 with drive power. The CPU 24 outputs a drive command signal to the high-frequency signal generating circuit 21 and further judges whether the immobilizer ECU 1 is disconnected from the power line L1 or whether a false unit is connected to the power line L1, based on the high-frequency signal detected by the high-frequency signal detecting circuit 22. Note, the CPU 24 does constitute a judging unit of the invention. The connector 25 forms a joint part for the above-mentioned constituents of the monitoring ECU 2.

Figure 5:
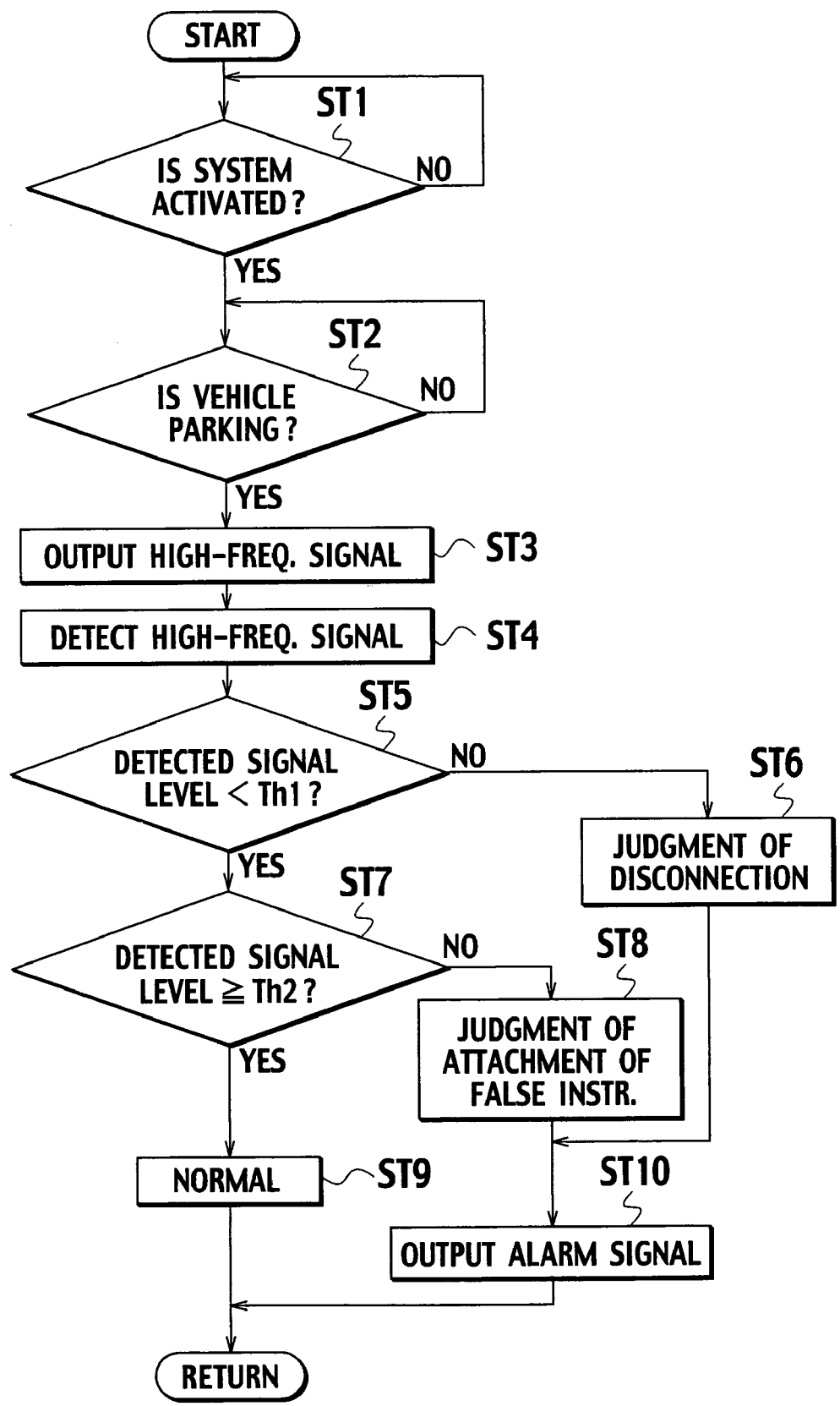
FIG. 5 is a flow chart showing the operation of the ECU monitoring device in accordance with the embodiment of the present invention.
Figure 7:
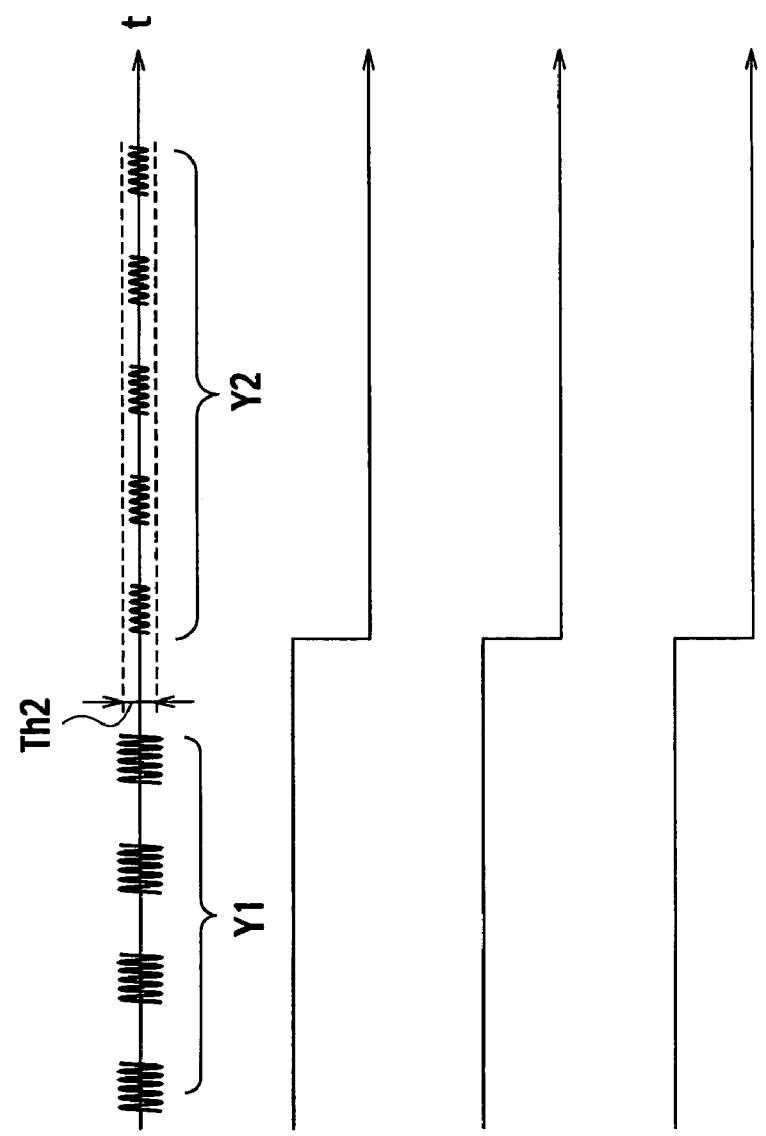
FIG. 7 is a timing chart showing the change of a high-frequency signal and the changes of other signals when an instrument is attached to a power line.

The operation of the ECU monitoring device of the embodiment will be described with reference to FIGS. 5, 6 and 7. FIG. 5 is a flow chart explaining the operation of the ECU monitoring device. FIGS. 6 and 7 are timing charts explaining the operation of the ECU monitoring device.

In FIG. 5, when the main battery B1 is connected to the power line L1 and further, the backup power source B2 is connected to the monitoring ECU 2 to activate the whole system, in other words, if the judgment at step ST1 is Yes, then the routine goes to step ST2 where it is judged whether a vehicle is now parking or not. The judgment whether or not the vehicle is now parking is enabled by information about the operation of the engine, which is brought from the engine ECU 5.

If the vehicle is parking (Yes at step ST2), then the routine goes to step ST3 where the high-frequency signal generating circuit 21 outputs high-frequency signals intermittently as shown with FIG. 6 (a). The outputted high-frequency signals are superimposed on the power line L1. At next step ST4, it is executed to detect the superimposed high-frequency signals by the high-frequency signal detecting circuit 22.

At next step ST5, the CPU 24 compares respective levels of the detected high-frequency signals with a first threshold value Th1 determined in advance. Now, if it is judged that the level of the detected signal is smaller than the first threshold value Th1 (Yes at step ST5), the routine goes to step ST7 where is it executed to further compare the level of the detected signal with a second threshold value Th2 determined in advance. Note, the first threshold value Th1 is set larger than the second threshold value Th2 (i.e. Th2<Th1).

If it is judged that the level of the detected signal is equal to or more than the second threshold value Th2 (Yes at step ST7), then the routine goes to step ST9 where it is judged that the immobilizer ECU 1 is connected with the power line L1 normally. Subsequently, the routine is returned to step ST1.

As for the process at step ST5 mentioned before, if the level of the detected signal is equal to or larger than the first threshold value Th1 (No at step ST5), the routine goes to step ST6 where it is judged that the immobilizer ECU 1 is being disconnected from the power line L1. Then, the routine goes to step ST10 where it is executed to allow the alarm unit 3 to generate an alarm signal.

Meanwhile, if it is judged that the level of the signal is smaller than the second threshold value Th2 (No at step ST7), the routine goes to step ST8 to judge that the other instrument is attached to the power line L1 falsely and subsequently goes to step ST10 to output the alarm signal by the alarm unit 3. In this way, when the immobilizer ECU 1 is detached from the device by thieving false manipulations or when a false instrument is connected to the power line L1 by the same manipulations, the device of the invention can detect such a situation certainly and output the alarm signal to the outside.

The changes of the high-frequency signals detected by the high-frequency detecting circuit 22 in the false detachment of the immobilizer ECU 1 will be described with reference to the timing chart of FIG. 6.

As mentioned above, when the vehicle is now parking, intermittent signals are outputted from the high-frequency signal generating circuit 21 [see FIG. 6 (a)] and superimposed on the power line L1. Now, if the immobilizer ECU 1 is normally connected to the power line L1, the high-frequency signals superimposed on the power line L1 come down in their respective levels since the power line L1 is also connected to ground through the bypass condenser C1. Therefore, the signals detected by the high-frequency signal detecting circuit 22 have small amplitudes of vibration in comparison with those of the signals shown with FIG. 6 (a), as shown with a mark X1 in FIG. 6 (b).

Whereas, if the immobilizer ECU 1 is detached from the power line L1 by false manipulations, the high-frequency signals superimposed on the power line L1 have amplitudes of vibration similar to those of the signals outputted from the high-frequency generating circuit 21 since the bypass condenser C1 is cut off from the power line L1 together with the immobilizer ECU 1, as shown with a mark X2 in FIG. 6 (c).

Then, as the high-frequency signals detected by the high-frequency signal detecting circuit 22 have levels more than the threshold value Th1, the monitoring ECU 2 detects such falseness [see FIG. 6 (c)]. Simultaneously, the power-off device 4 is activated so as to cut off power supply by the monitoring ECU 2, as shown in FIG. 6 (d). Additionally, the monitoring ECU 2 outputs a "standstill" command signal to the engine ECU 5, as shown in FIG. 6 (e).

As a result, the engine ECU 5 is brought into a standstill condition and furthermore, the power for driving is not supplied from the main battery B1. In this state, anyone cannot start up the engine. Simultaneously, the alarm signal is generated from the alarm unit 3, so that a situation where the vehicle may be being stolen by thieving is informed to the circumference around the vehicle.

Thus, even if a person trying to invade the vehicle falsely (e.g. thief) intends to call off an alarm by detaching the immobilizer ECU 1 from the power line L1, the person is unable to start the driving of the engine and additionally, the alarm signal is produced by the alarm unit 3. In this way, it is possible to prevent the vehicle from being stolen.

Next, if another instrument is attached to the power line L1 falsely, then the levels of the high-frequency signals remarkably drop since an electric potential of the power line L1 is lowered through the so-attached instrument.

While, if no false instrument is attached to the power line L1, the high-frequency signal shown in FIG. 7 (a) and superimposed on the power line L1 have their levels lowered by the bypass condenser C1 as shown with a mark Y1 in FIG. 7 (*b*), which are similar to those shown with the mark Xi in FIG. 6 (*b*).

In case of the attachment of the false instrument to the power line L1, the electrical potential of the same line L1 is lowered. As a result, the waveforms of the high-frequency signals detected by the high-frequency signal detecting circuit 22 have remarkably small amplitudes of vibration, as shown in a mark Y2 in FIG. 7 (*b*). By the high-frequency signal detecting circuit 22, it is detected that the levels of the signals are smaller than the second threshold value Th2. In such a case, the monitoring ECU 2, above all, the CPU 24 judges that any false instrument has been attached to the power line L1 [see FIG. 7 (*c*)]. Simultaneously, the power-off device 4 is activated so as to cut off power supply by the monitoring ECU 2, as shown in FIG. 7 (*d*). Additionally, the monitoring ECU 2 outputs the "standstill" command signal to the engine ECU 5, as shown in FIG. 7 (*e*).

Consequently, as well as the detachment of the immobilizer ECU 1 from the power line L1, the engine ECU 5 is brought into a standstill condition and furthermore, the power for driving is not supplied from the main battery B1. In this state, anyone cannot start up the engine. Simultaneously, the alarm signal is generated from the alarm unit 3, so that a situation where the vehicle may be being stolen by a thief is informed to the circumference around the vehicle. Here, it should be noted that the level of a high-frequency signal superimposed on the power line L1 varies dependently of the number of instrument to be connected with the power line L1. Therefore, even if a theft intends to attach a dummy instrument to the power line L1 prior to falsely detaching the immobilizer ECU 1 from the power line L1, such a false manipulation could be detected at a point of time of attaching the dummy instrument to the power line L1. Thus, the ECU monitoring device of the invention is capable of outputting an alarm signal at a point of time before the vehicle is stolen.

As mentioned above, in the ECU monitoring device of the invention, the high-frequency signals are superimposed on the power line L1 connecting the main battery B1 with the immobilizer ECU 1 and the resultant superimposed signals are detected. Further, based on the magnitudes of the levels of the so-detected high-frequency signals, the device judges whether or not false manipulation are being performed by a theft. Accordingly, it is possible to detect false manipulations certainly, whereby the theft of a vehicle can be prevented.

Additionally, when it is judged that the level of a high-frequency signal(s) is equal to or more than the first threshold value Th1, an alarm signal is generated upon the judgment that the immobilizer ECU 1 has been detached from the power line L1. Similarly, when it is judged that the level of a high-frequency signal(s) is smaller than the second threshold value Th1, the alarm signal is also generated upon the judgment that a false instrument has been attached to the power line L1. Therefore, it is possible to prevent various false manipulations for breaking down the function of an immobilizer, improving the antitheft capability of the device remarkably.

According to the embodiment, since the intermittent high-frequency signals are employed as monitoring signals to be superimposed on the power line L1, it is possible to detect any change in the level of the high-frequency signal(s) with high accuracy and also possible to reduce an electric power consumption of the device.

Again, since the ECU monitoring device of the embodiment is equipped with the backup battery B2, even if the main battery B1 were disconnected from the power line L1, the monitoring ECU 2 could be operated certainly, allowing prevention of the theft of a vehicle.

According to the embodiment, owing to the provision of the alarm unit 3, it is possible to inform those around the vehicle of an execution of false manipulations certainly, improving the antitheft capability of the device furthermore. Note, instead of generating the alarm signal, the alarm unit 3 may be in the form of operating an automotive horn or lighting a winker lamp built in the vehicle.

Further, since the ECU monitoring device of the invention is not structured so as to adopt a standard protocol like the conventional CAN communication system, it precludes such a false manipulation as reading data with the use of a commercial instrument, whereby the antitheft capability of the device can be improved. As there is no need to arrange an exclusive line for detecting the false manipulations, the circuitry of the device can be simplified. Additionally, since the high-frequency signals superimposed on the power line L1 have weak abdominal pressures, the ECU monitoring device of the invention can exhibit high concealment.

Again, it will be understood by those skilled in the art that the foregoing descriptions are nothing but one embodiment of the disclosed ECU monitoring device and the modifications. In addition to the above modifications, various changes and modifications may be made to the present invention without departing from the scope of the invention. For instance, the intermittent high-frequency signals used as the monitoring signals on use may be changed to the other signals. Furthermore, although the backup battery B2 is separated from the monitoring ECU 2 in the shown embodiment, the same battery B2 may be incorporated in the monitoring ECU 2.

What is claimed is:

1. A monitoring device for monitoring a connection between electronic control units mounted on a vehicle, the monitoring device comprising:
   a main battery;
   a power line connecting the main battery with an electronic control unit to be monitored, thereby supplying the electronic control unit with a power of the main battery; and
   a monitoring unit connected to the power line, wherein:
   the monitoring unit includes:
      a monitoring-signal generating unit for superimposing a monitoring signal on the power line connecting the main battery with the electronic control unit to be monitored;
      a monitoring-signal detecting unit for detecting the monitoring signal superimposed on the power line; and
      a judging unit for judging the presence of at least one of connection between the power line and the electronic control unit to be monitored or connection between the power line and a false instrument, based on a level of the monitoring signal detected by the monitoring-signal detecting unit.

2. The monitoring device as claimed in claim 1, wherein:
   the judging unit compares the level of the monitoring signal with a first threshold value pre-determined;
   the judging unit judges that the electronic control unit to be monitored is in a normal condition when the level of the monitoring signal is smaller than the first threshold value; and the judging unit judges that the electronic control unit to be monitored is disconnected from the power line when the level of the monitoring signal is equal to or larger than the first threshold value.

3. The monitoring device as claimed in claim 2, wherein:
the judging unit compares the level of the monitoring signal with a second threshold value smaller than the first threshold value; and
the judging unit judges that the electronic control unit to be monitored is connected to the false instrument when the level of the monitoring signal is smaller than the second threshold value.

4. The monitoring device as claimed in claim 1, wherein the monitoring signal comprises high-frequency signals outputted intermittently.

5. The monitoring device as claimed in claim 1, further comprising a backup battery for supplying the monitoring unit with a driving power.

6. The monitoring device as claimed in claim 1, further comprising an alarm unit that generates an alarm signal when it is detected that the electronic control unit to be monitored is disconnected from the power line.

7. The monitoring device as claimed in claim 1, wherein the judging unit further stops a drive of an engine electronic control unit for controlling a drive of an engine when the judging unit judges that the electronic control unit to be monitored is disconnected from the power line or that the electronic control unit to be monitored is connected to the false instrument.

8. The monitoring device as claimed in claim 1, wherein the electronic control unit to be monitored comprises an immobilizer electronic control unit for protecting the vehicle against theft.

* * * * *